US007591196B2

(12) United States Patent
Wilson

(10) Patent No.: US 7,591,196 B2
(45) Date of Patent: Sep. 22, 2009

(54) CORE SPLITTERS

(75) Inventor: John David Wilson, Bryanston (ZA)

(73) Assignee: Corstor International (Proprietary) Limited, Gauteng (ZA)

( * ) Notice: Subject to any disclaimer, the term of this patent is extended or adjusted under 35 U.S.C. 154(b) by 84 days.

(21) Appl. No.: 10/589,977

(22) PCT Filed: Feb. 18, 2005

(86) PCT No.: PCT/IB2005/000412

§ 371 (c)(1),
(2), (4) Date: Aug. 18, 2006

(87) PCT Pub. No.: WO2005/081624

PCT Pub. Date: Sep. 9, 2005

(65) Prior Publication Data

US 2007/0180932 A1 Aug. 9, 2007

(30) Foreign Application Priority Data

Feb. 19, 2004 (ZA) ................................ 2004/1357

(51) Int. Cl.
*G01N 1/22* (2006.01)

(52) U.S. Cl. ................ 73/863.11; 73/864.41; 83/477.2

(58) Field of Classification Search .................. 83/164, 83/477.2; 125/12-22; 73/863.11
See application file for complete search history.

(56) References Cited

U.S. PATENT DOCUMENTS 4,372,174 A * 2/1983 Cymbalisty et al. ...... 73/863.11

FOREIGN PATENT DOCUMENTS

AU 34500/95 5/1996
AU 40375/95 6/1996
GB 2235154 A * 2/1991

* cited by examiner

*Primary Examiner*—Hezron Williams
*Assistant Examiner*—Mark Shabman
(74) *Attorney, Agent, or Firm*—Fitzpatrick, Cella, Harper & Scinto

(57) ABSTRACT

A core splitter comprises a trough in which a core support is carried. A cutting head carries a rotary cutting tool which is contained within a cowling. The trough contains a water bath in which the core is located below the water level so that the cutting operation take place in the water. A settling tank is provided at one end of the trough so that any cuttings are moved to the settling tank. During the cutting operation, the core is mounted in a core carrier, which is supported by the core support.

3 Claims, 8 Drawing Sheets

CORE SPLITTERS

This invention relates to core splitters.

Borehole core samples which have been drilled from rock are normally of elongated cylindrical shape. When these are examined, they are often require destructive testing. In order that an accurate record sample of the core is maintained, the core is usually split along diametral planes into two or more parts so that one can be examined and the other retained as a record sample. The cutting of the core in this way is an extremely difficult and inconvenient operation. The engagement of the cutting disc with the core, which is normally very hard, to effect the cutting operation is extremely noisy. Furthermore a significant amount of dust and cuttings are formed during the cutting operation. In practice it is very difficult to contain the dust so that an workplace and indeed the workman too is covered with dust.

According to one aspect of the invention there is provided a method cutting a borehole core sample using locating means for holding the core sample and a cutting device, comprising submerging the core sample in a liquid bath and then moving the cutting device relative to the core sample to cut the sample in the bath.

Preferably the locating means will be fixed and the cutting head will move relative thereto.

According to another aspect of the invention there is provided a core splitter comprising a trough in which the liquid bath will in use be contained, a core support device for holding a core in position during a cutting operation, which device is located within the trough, and a cutting head to which a cutter may be attached and which can be moved along the trough to cut the core along radial planes into two or more parts. The trough is preferably substantially watertight and the core support device is conveniently located at a position such that when the trough has an appropriate amount of water therein, the core will be below the level of the water. The cutting head preferably runs along linear bearing means located longitudinally above the trough.

The cutting head preferably comprises a rotatable cutting tool, preferably a cutting blade, that is driven directly by an electric motor, and a cowling within which the tool is contained. The cowling is preferably arranged so as to have its lower edges submerged within the bath.

A settling tank is preferably provided to receive cuttings from the water. This settling tank is preferably located below and at one end of the trough. A concentration tank is also conveniently provided as is means to deliver the sludge from the settling tank so that further settling can take place.

The core splitter preferably comprises means for moving the head along the length of the trough. Such means preferably comprises an elongated screw member which engages in a nut that is carried by the head and which, when rotated, moves the head.

According to another aspect of the invention there is provided a core holder in which the core is carried in the aforesaid core splitter during the aforesaid method, the core holder being of polygonal and preferably hexagonal section and dimensioned to hold the core firmly, the core holder having a slot at its upper end through which the cutter can enter the core holder to cut the core. At the lower end, the core holder is preferably provided with slots through which the cuttings and other detritus formed during the cutting operation can pass into the trough. The lower portion of the core holder is preferably shaped to correspond to the core support device so as to be firmly held in position thereby.

An embodiment of the invention will now be described by way of example with reference to the accompanying drawings.

In the drawings:

FIG. 1 is a side view of a core splitter of the invention showing the means for moving the head along the trough, FIG. 2 is another side view of the core splitter showing different parts, FIG. 3 is a perspective view of the bath member, FIG. 4 is an enlarged transverse section of the core splitter, the section being taken on line 4-4 of FIG. 1, FIG. 5 is an enlarged detail of FIG. 4 showing the core during the cutting operation, FIG. 6 is an enlarged detail of FIG. 4 showing the cutter head and its supports.

Figure 1:
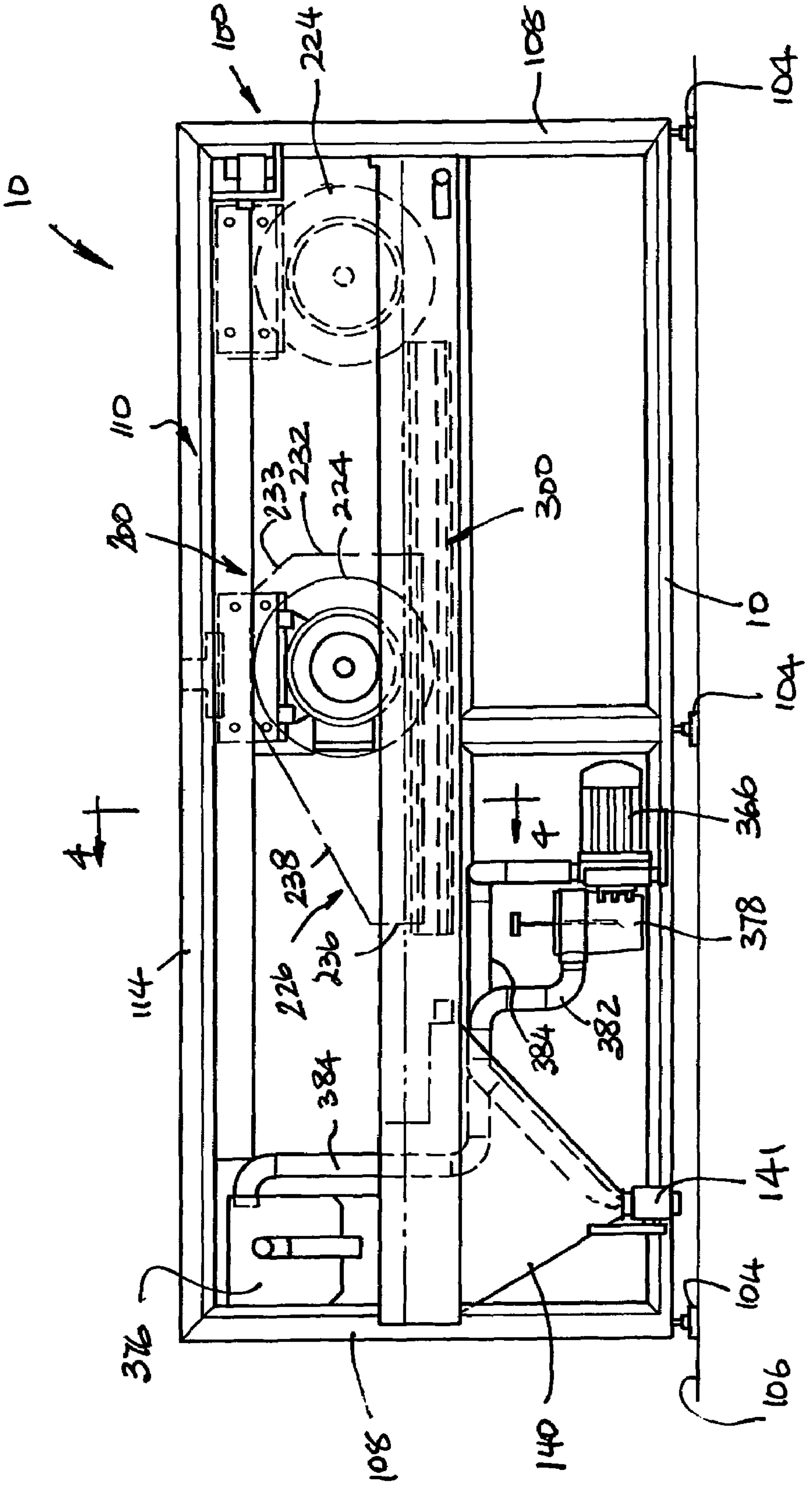

Referring now to the drawings there is shown a core splitter 10 of the invention.

The core splitter 10 comprises a framework 100, a cutter head 200 and a core support 300.

Figure 3:
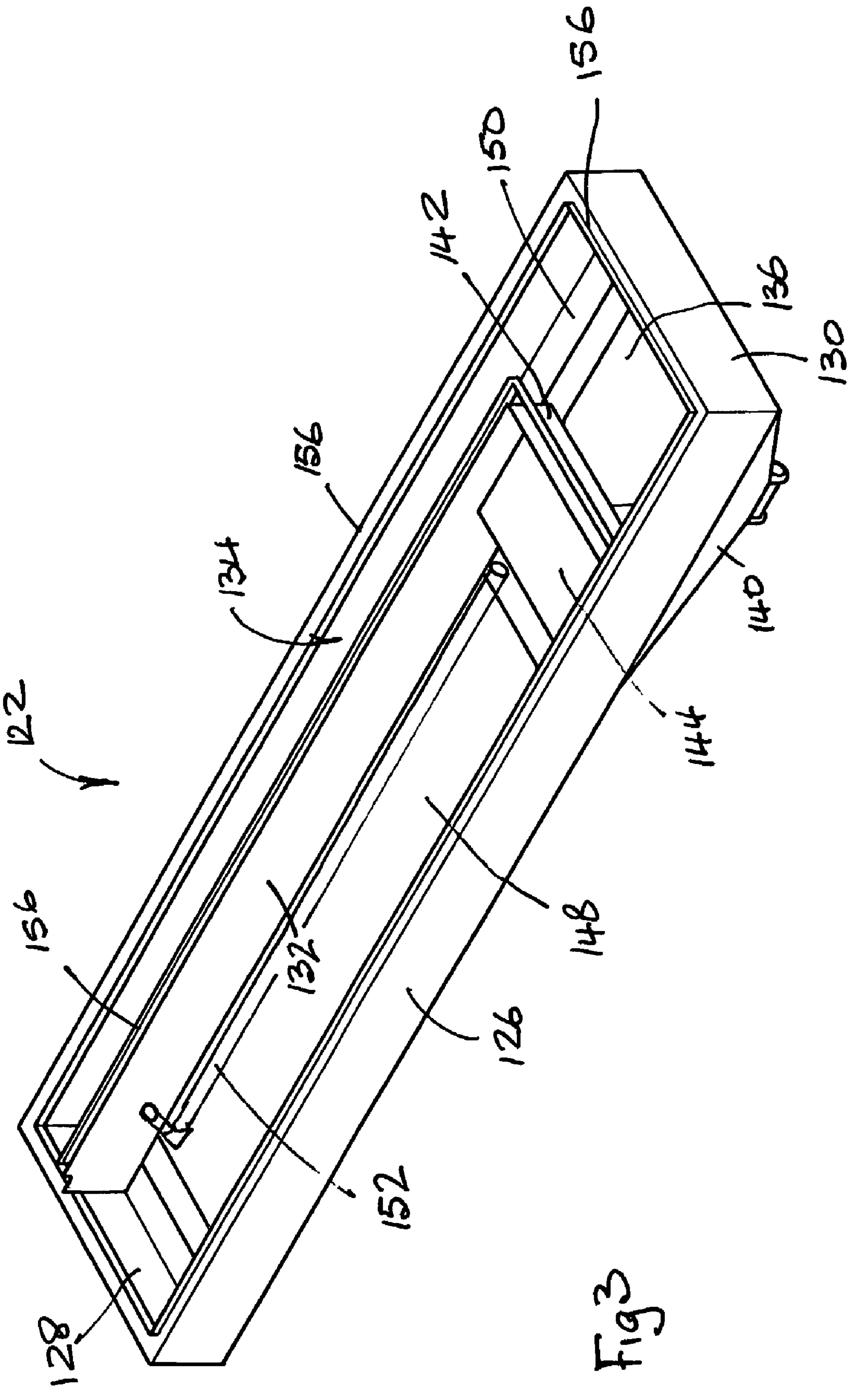
Figure 6:
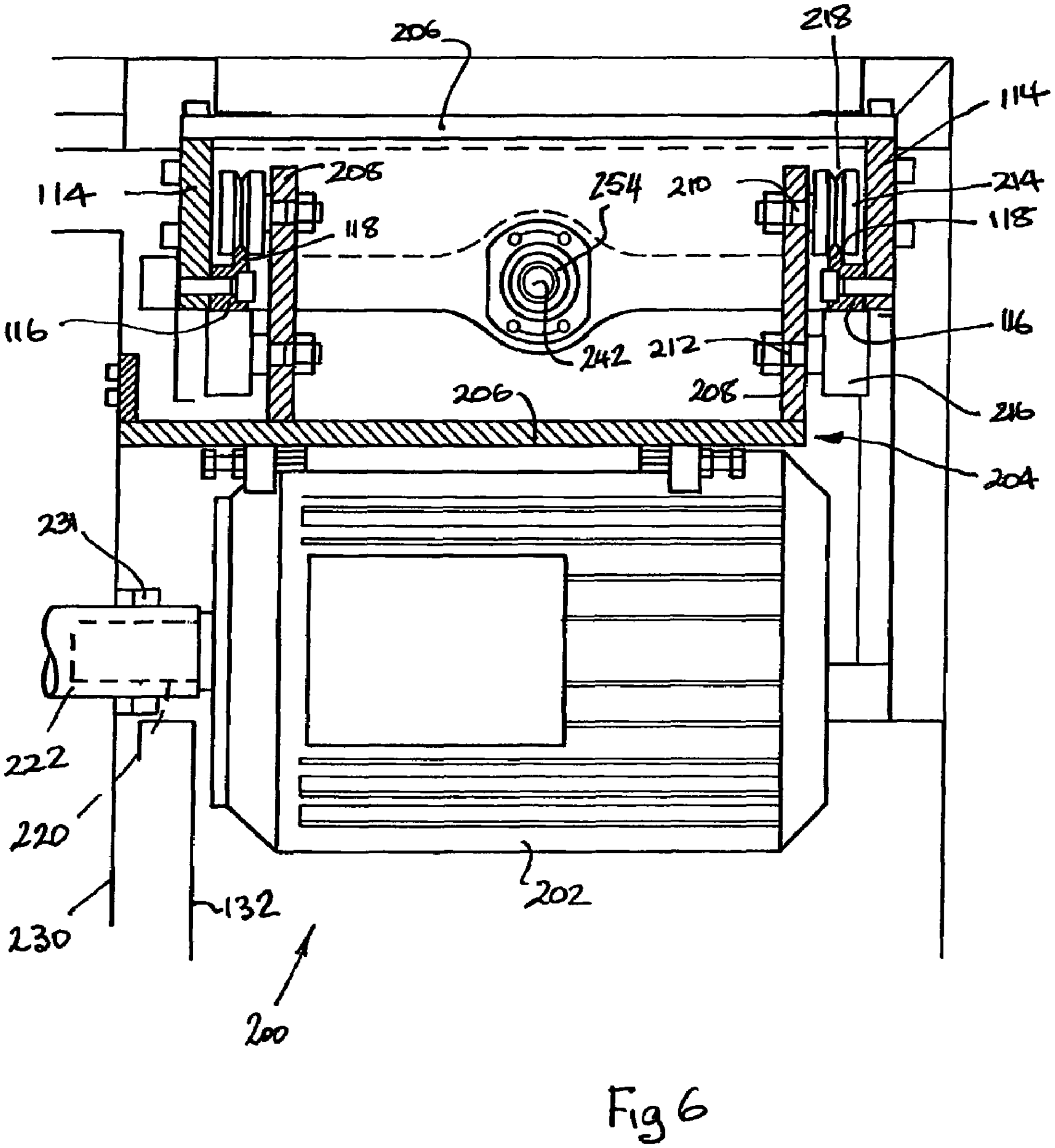

The framework comprises an elongated rectangular base member 102 carried on feet 104 on the ground 106. At the corners the base member 102 carries vertical members 108 on which is mounted a top portion 110. The top portion 110 carries a robust longitudinally extending horizontal member 112 from the edges of which depend vertical plates 114 (best shown in FIGS. 3, 4 and 6). On the inside lower parts of the plates 114 are bolted raceways 116 which constitute linear bearing means as will become apparent below. A low rim 118 is provided on the upper side of each raceway 116 near its inside edge.

The framework 100 carries a horizontal bath member 122. The bath member 122 consists of two longitudinal walls 124 and 126 and two end walls 128 and 130. A longitudinally extending inner wall 132 is located close to one side wall 124 to form therewith a narrow trough 134. At the end of the trough 134 adjacent the end wall 130 is a substantially rectangular opening 136 below which is a frusto pyramidal settling tank 140 having a sump 141 at its lowest point. There is a transverse low wall 142 extending from the inner wall 132 to the wall 126 defining one end of the opening 136. The settling tank 140 extends beyond this wall 142 and its inner portion is covered by a plate 144. A closure 146 extends from the end of the plate 144 to a floor 148 on the side of the inner wall 132 opposite to the trough 134. This floor 148 is a continuation of the floor 150 of the trough 134.

A pipe 152 extends from the closure 146 over the floor 148 to the wall 132 near to the end wall 126 for the purpose which will be described.

Figure 5:
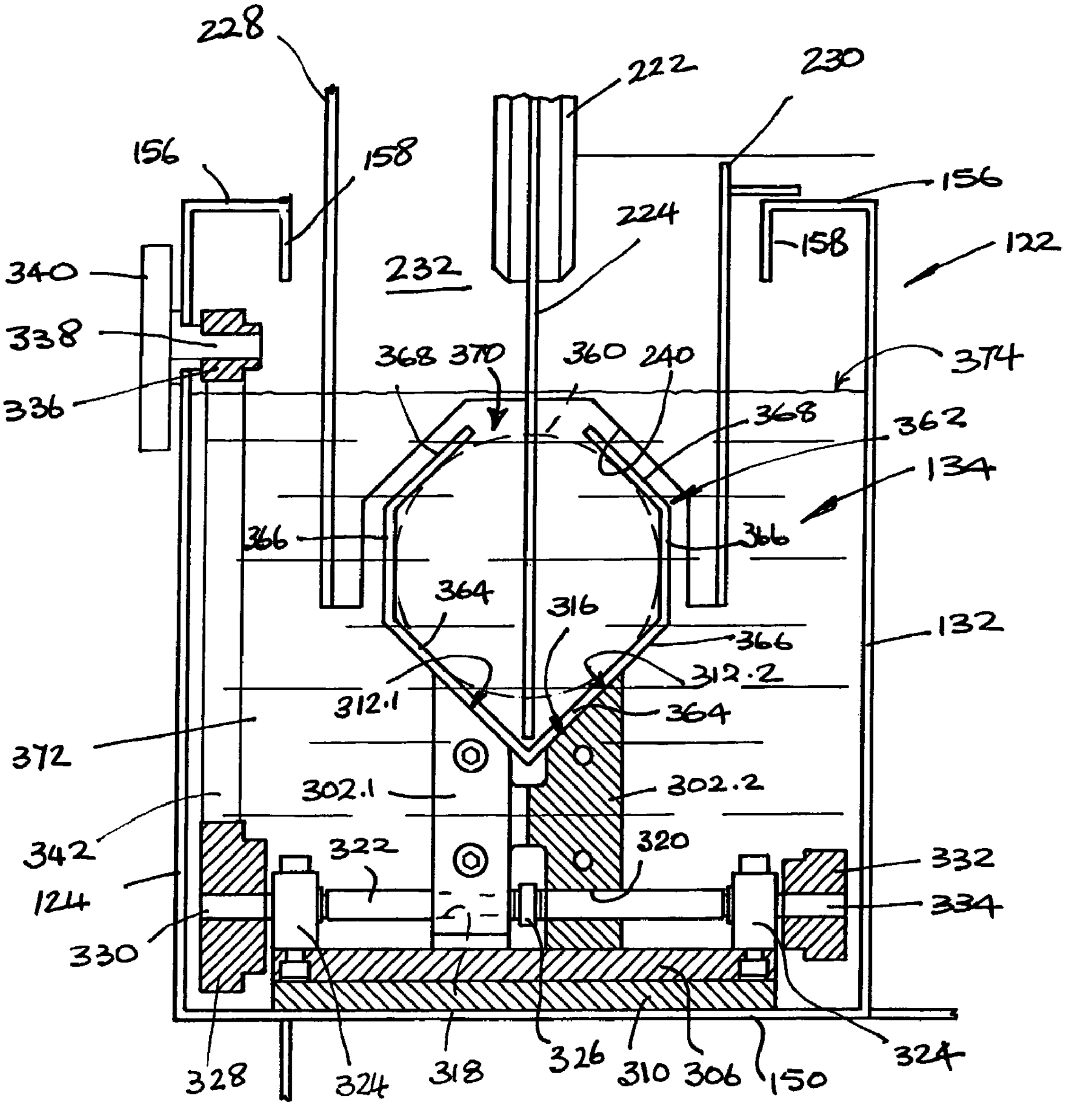

The upper ends of the walls 124 and 132 have inwardly directed flanges 156 which lie over the trough 134 (best shown in FIG. 5). A downwardly depending rim 158 is provided at the inner end of each flange 156.

Figure 7:
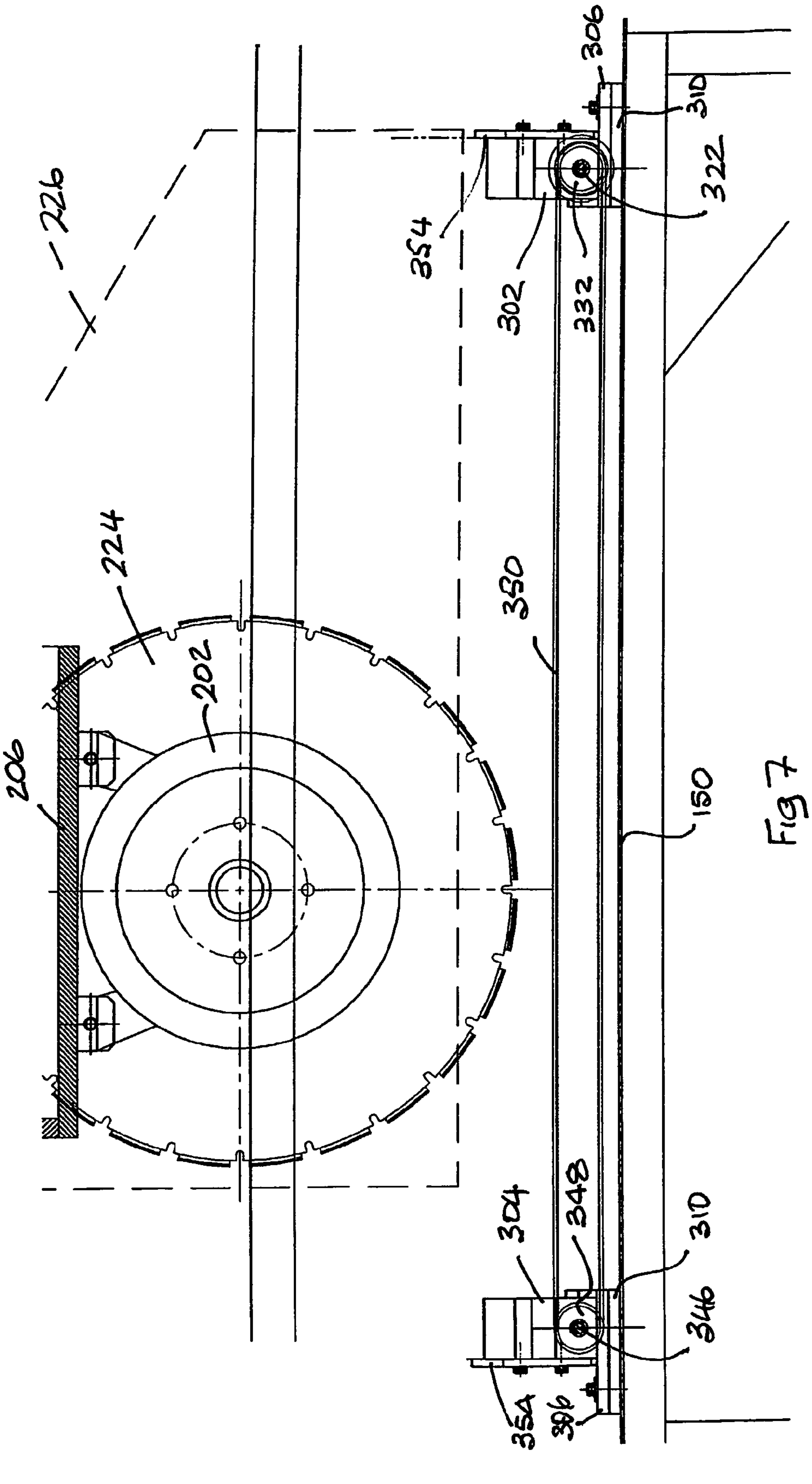
FIG. 7 is an enlarged detail showing the support members for the core.

The core support 300 comprises two pairs 302 and 304 of robust square section solid support members located at about one metre apart within the trough 134 (as see in FIG. 7). The support members of each pair are mounted in carrier plates 306 and 308 which are each supported on intermediate plates 310 and 321 and are secured to the floor 150 of the trough 134. The members 302 and 304 are mounted on the carrier plates in such a way that they can move relative thereto transversely to the trough 134. The carrier plates 306 and 308 are mounted on the intermediate plates 310 and 231 in such a way that they can be moved slightly transversely to the trough 134 to ensure that the members 302 and 304 are centrally located in the trough 134.

The upper ends 312.1 and 312.2 of the members 302 and 304 are inclined to the vertical by 45°. They thus form a 90° seat 316 as will described more fully below.

A pair of aligned transverse bores 318 and 320 are formed in the support members 302.1 and 302.2. A threaded adjustment bolt 322 passes through these bores 318 and 320 and is journalled in plumber blocks 324 mounted on the carrier plate. The ends of the bolt 322 extend beyond the plumber blocks 324 for the reasons that will be described. From its central part 326, the bolt 322 is threaded in opposite directions and the bores 318 and 320 are complementarily threaded. Thus as the bolt 322 is rotated, the support members 302.1 and 302.2 are moved towards and away from one another.

A pulley 328 is provided on the projecting end 320 of the bolt 322 nearer the wall 124 and a similar pulley 332 is provided on the other projecting end 334 of the bolt 322. A drive pulley 336 is carried by a shaft 338 journalled in the wall 124 and this is provided with a control wheel 340 outside the journal. A belt 342 joins that pulleys 332 and 324.

The other pair of support members 304 are substantially identical to the members 320. In this arrangement the adjustment bolt 346 extends beyond the plumber block nearer the inner wall 132. A pulley 348 is provided on this extension. A belt 350 joins the pulleys 332 and 348 near the wall 132. It will be seen therefore that by rotating the control wheel 340, both adjustment bolts 322 and 346 will be rotated and the support members of each pair 302 and 304 will be moved transversely towards and apart from one another.

Bolted to the remote surfaces of each pair of support members is flat transverse plate 354 which will limit longitudinal movement of the core 360.

Figure 8:
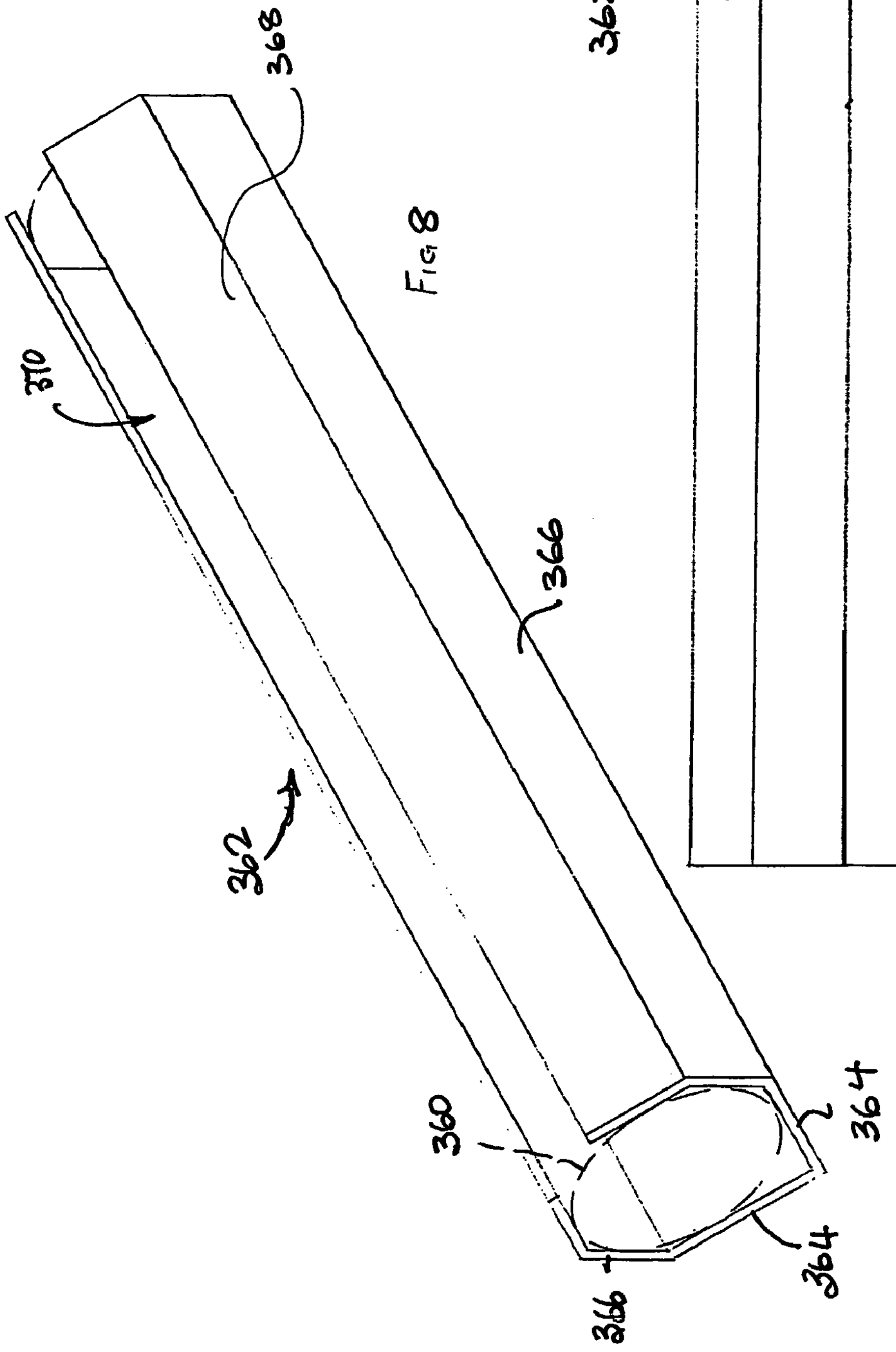
FIGS. 8 and 9 are respectively a perspective view and a side view of a core holder for holding the core during the cutting operation.
Figure 9:
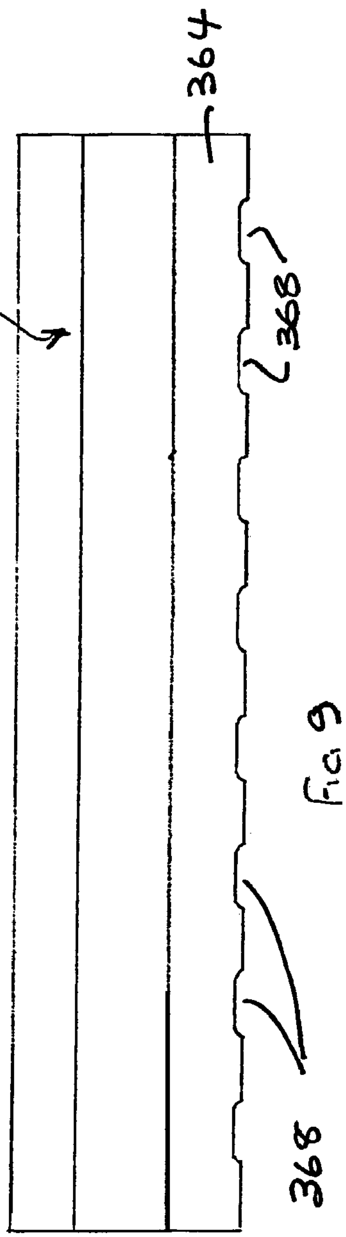

In order to locate a core 360 accurately on the support members 302, 304, it is placed in a carrier 362 (see FIGS. 5, 8 and 9). The carrier 362 is a bent sheet steel member comprising a pair of lower surfaces 364 located at right angles to one another, a pair of vertical surfaces 366 and a pair of upper surfaces 368 which are at right angles to one another but which stop short of meeting each other to provide an opening or slot 370 running along its length. The vertical members 366 are spaced apart by a distance slightly greater than the diameter of the core 360. Openings preferably in the form of slots 368 are provided in the lower portion of the carrier 362 through which the cuttings and other detritus formed during the cutting operation can pass into the trough In use, the trough 134 is filled with water 372 to a level 374 slightly higher than the height of the core 360 when in the carrier and supported on the support members. The level 374 is slightly lower than the shaft 338 which passes through the wall 124.

Placed above the opening 136 is a concentration tank 376. A pump 378 driven by a motor 380 (not shown in FIG. 2) is provided below the bath member 122. It has an inlet pipe 382 and an outlet pipe 384. The inlet pipe 382 enters and opens in the sump 141 of the settling container 140. The outlet pipe 384 delivers into the concentration tank 376.

Figure 2:
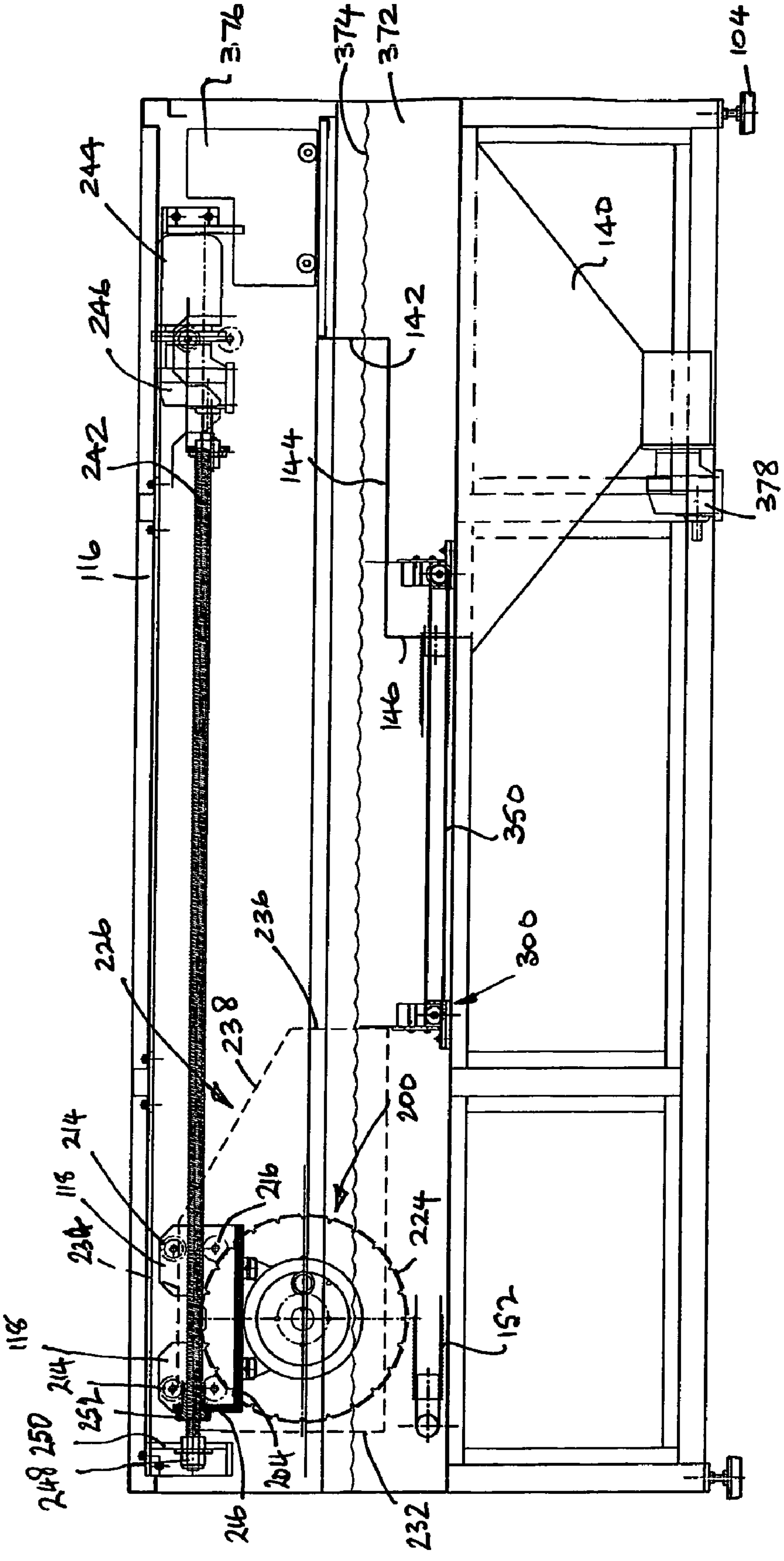
Figure 4:
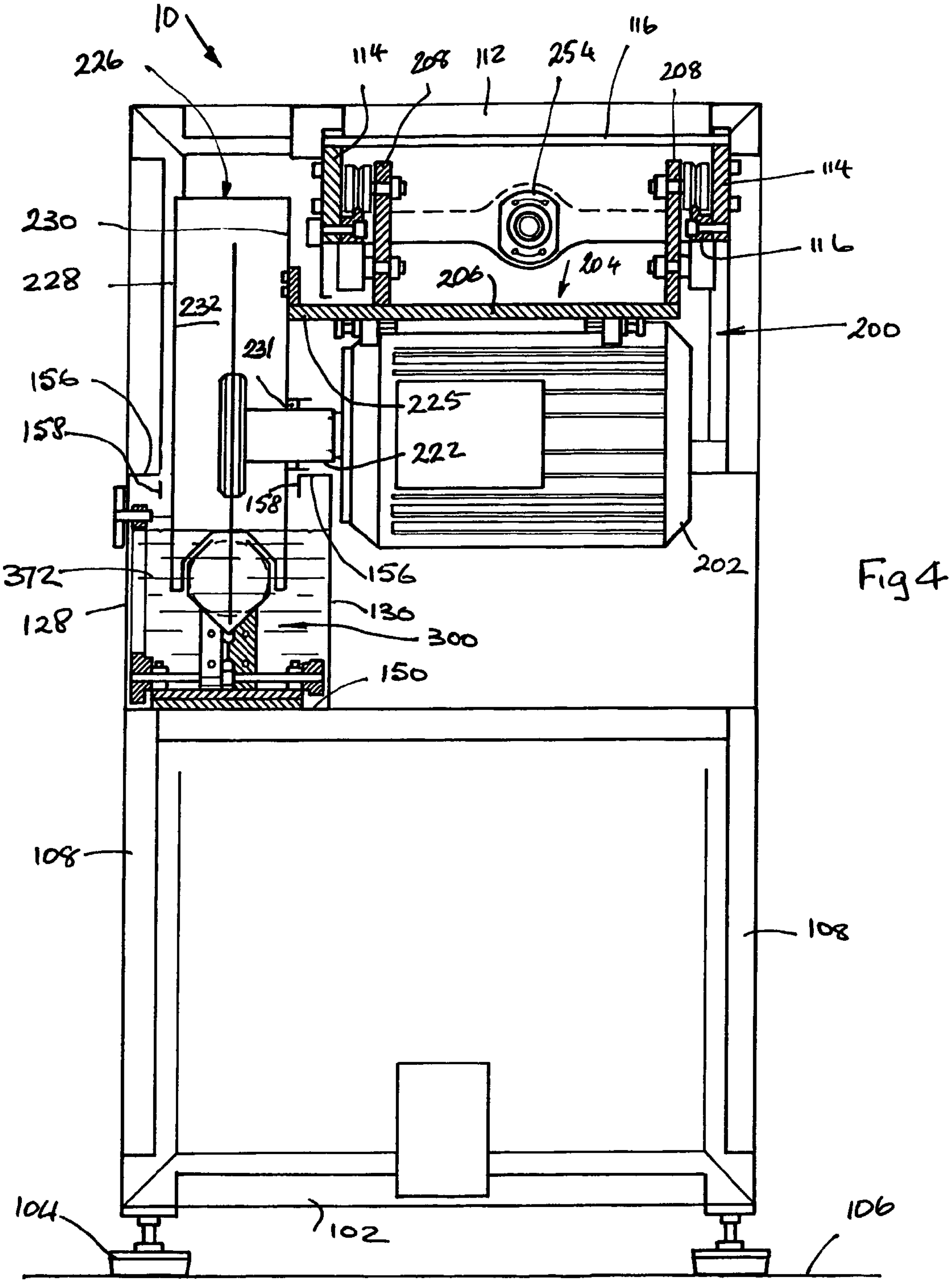

The cutter head 200 is best shown in FIGS. 2, 4 and 5. The cutter head 200 comprises a drive motor 202 that is suspended from a cradle 204. The cradle 204 consists of a robust horizontal plate 206 that is carried by a pair of robust side walls 208 which are located close to the ends of the raceways 116. Each side wall 208 has respectively near its ends two pairs of shafts 210 and 212 located one above the other and projecting from its outer surface. These shafts 210 and 210 respectively carry upper and lower rollers 214 and 216. The lower roller 216 runs on the lower surface of the adjacent raceway 116. The upper roller 214 has a peripheral groove 218 in which the rim 118 is accommodated so as to support the roller 214 and with it the cradle 204 and so that the lateral movement of the cradle will be controlled. This arrangement permits the cradle 204 to move smoothly along the plate 206 as will be described below.

Mounted on the drive shaft 220 of the motor 202 is a tool carrier 222. The carrier 222 has a central boss 223 which fits on the shaft 220. The carrier 222 carries a cutting disc 224. The diameter of the cutting disc 224 is such that its lower horizontal tangent will normally be below the lowest portion of the core 350 when mounted in the support members 302 and 304 and hence will have a substantial portion below the water level 374.

The horizontal plate 206 has an extension 225 leading towards the cutting disc 224 and carrying a hollow cowling 226. The cowling 226 comprises two parallel hexagonal side walls 228 and 230 equispaced about the cutting disc 224. There is an opening in the side wall 230 through which the boss 223 of the tool carrier passes and a cylindrical projecting seal 231 engages the carrier to prevent water escaping from within the cowling 226. The cowling 226 further comprises a vertical front wall 232 located near to the front-most portion of the disc 224 and rising to an inclined wall 233 connected to top wall 234. A vertical rear wall 236 extends upwardly to about half the height of the cowling 226 and an inclined wall 238 joins it to the top wall 234. The rear wall 236 is spaced from the rearmost portion of the disc 224 by a distance about three quarters of the diameter of the cutting disc 224. The lower ends of the front and rear walls 232 and 236 respectively have openings 240 which correspond to and accommodate the upper part of the carrier 362 (See FIG. 5). As can be seen from the drawings, the lower edges of the cowling are submerged within the bath.

An arrangement is provided for moving the cradle 204 along the plate 206. This arrangement comprises a threaded elongated shaft 242 (see FIG. 2) extending along the framework 100 at the same level as the raceways 116. At the end of the framework 100 above the settling tank 140 there is a drive motor 244 connected to the shaft 242 through a reduction gear box 246. The other end of the shaft 242 is rotatably carried in a journal 248 carried by a vertical plate 250 depending from the plate 116. A transverse member 252 forming part of the cradle 204 incorporates a hollow threaded member or nut 254 through which the shaft 242 passes. As the shaft 242 is rotated, the cradle 204 is moved.

In use, the bath member 122 is provided with water 372 up to the level 374. The core 360 is mounted in a carrier 362. It is placed on the support members 302 and 304. If necessary the support members (302.1 and 302.2 and 304.1 and 304.2) are moved apart by the control disc 340 so that the core 360 is at the appropriate height for cutting purposes. The cutter head 200 is located at the beginning of the traverse above the settling tank 140. The motor 202 commences rotation. This causes the cutter disc 224 to rotate in a direction such that the part of the disc near the front face 232 of the cowling is moving downwardly. At the same time the motor 244 is also operated rotating the shaft 242 causing the cutter head 200 to move along the raceways 116. The cutting disc will engage the core 360 and will cut through the core.

It will be seen that the cutting operation will take place below the level 374 of the water 372. This will have the effect of significantly limiting the noise caused during the cutting operation. Furthermore all the cuttings and dust formed by the cutting operation will be contained within the water 372. In addition, the cowling 226 will prevent water from splashing outside the apparatus. However the cutter disc 224 as it rotates forces the water towards the settling tank 140 where its level rises relative to the water level at the front end of the trough 134. The water now runs down the pipe 152 to the front end of the trough 134. At the same time the water carries the cuttings to the settling tank 140 so that it is removed from the water in the trough 134.

Periodically the pump 378 will be actuated to draw the dust sludge from the settling tank 140 and to discharge it into the concentration tank 376. The sludge settles in this tank and the excess clarified water spills over into the opening 136 to join the water used in the operation. On suitable occasions, the container 376 is removed to discharge the sludge at a suitable waste collection.

It will be appreciated that the core splitter can be used to split a core 360 into two semi-cylindrical samples. However by moving the support members apart and there by lowering the position of the core 360, the cutting disc 224 can make cuts to about the centre of the core and the core can then be rotated so that a sample is produced which has a cross-section of a circular sector with an apex angle of 40°, 45° or any other angle as desired.

The invention is not limited to the precise constructional details hereinbefore described and illustrated in the drawings.

The invention claimed is:

1. A core splitter comprising:

a trough in which a liquid bath will, in use, be contained;

a core support device for holding a core in position during a cutting operation, the core support device being located within the trough;

a cutting head to which a cutter may be attached and which can be moved along the trough to cut the core along one or more radial planes into two or more parts; and a core holder in which the core is carried, the core holder being of polygonal section and dimensioned to hold the core firmly, the core holder having a slot at its upper end through which the cutter can enter the core holder to cut the core.

2. A core splitter as claimed in claim 1, wherein the core holder is provided at a lower end with slots through which cuttings and other detritus formed during the cutting operation can pass into the trough.

3. A core splitter as claimed in claim 1, wherein the core holder is of hexagonal section.

* * * * *